June 21, 1960    J. B. MANN    2,941,578
SEAT RETAINER FOR AUTOMOBILES
Filed Nov. 2, 1956
FIG. 1
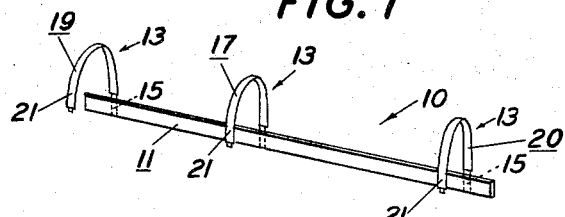
FIG. 2
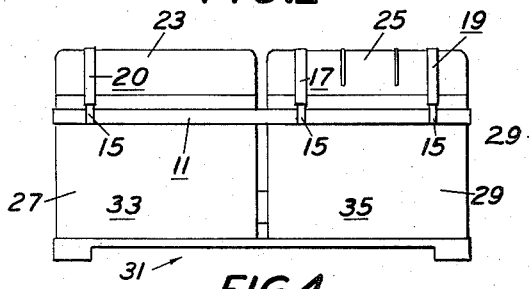
FIG. 3
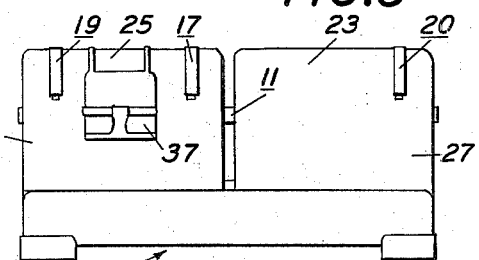
FIG. 4
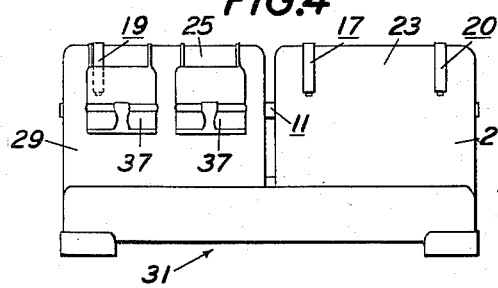
FIG. 5
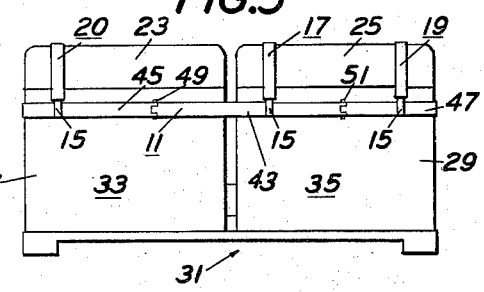
FIG. 6
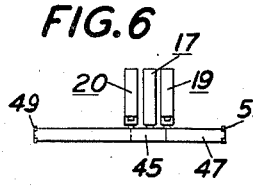
FIG. 7
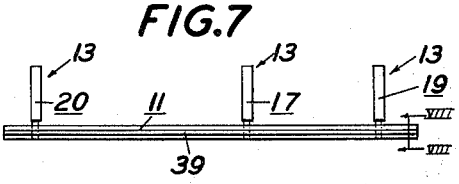
FIG. 8
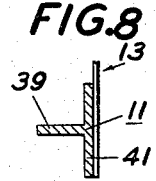
FIG. 9
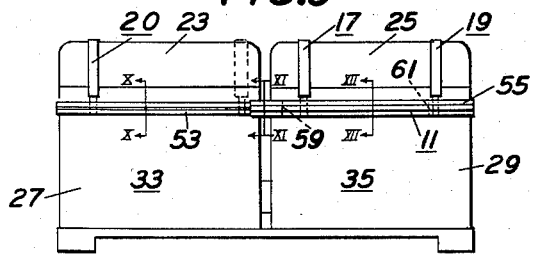
FIG. 10  FIG. 11  FIG. 12
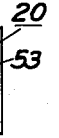 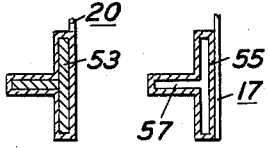
INVENTOR.
JUNE B. MANN
BY John R. Walker III
atty

United States Patent Office 2,941,578
Patented June 21, 1960

2,941,578

SEAT RETAINER FOR AUTOMOBILES

June B. Mann, Marianna, Ark., assignor of one-half to John R. Walker III, Memphis, Tenn.

Filed Nov. 2, 1956, Ser. No. 620,009

1 Claim. (Cl. 155—11)

This invention relates to a seat retainer adapted to be used in conjunction with an automobile seat. More particularly, the present invention is useful with the familiar type of front seat in two-door automobiles which seat is constructed with two side-by-side seat backs that are forwardly and downwardly tiltable to establish an ingress and an egress for the back seat.

As is common practice, so called "baby car seats" are hung over the backs of such seats whereby a baby may be carried therein to free the driver and passengers from having to hold the baby. The danger inherent with the use of such "baby car seats" is readily apparent to those who have employed or observed this practice. Upon stopping the car, as for example when easing up to a stop sign, there is the tendency of the seat, upon which the "baby car seat" is suspended, to tilt forwardly and cause the baby to be injured by striking the dashboard. A sudden stop, of course, would cause a more violent thrust forward with the danger of a serious accident, both by the baby striking the dashboard and the driver attempting to catch the baby with the possibility of the driver losing control of the car. Additionally, there is the danger with seats of this type of the seat backs yielding under the thrust of the passengers in the back seat and the passengers striking the front windshield as when they are thrown forwardly by a sudden stopping of the car.

The present invention is directed towards overcoming the above mentioned dangers by providing a simple and inexpensive seat retaining means to prevent such seat backs from tilting forwardly. Thus, the present seat retaining means is a valuable contribution towards safety in this day and time of growing emphasis on safety in automobiles. Additionally, with the present invention it is now possible to use two "baby car seats" side-by-side suspended from the seat back. This has heretofore been impractical since with the added weight of a second child the seat back would tilt even with the slightest deceleration of the car.

The principal object of the present invention is to provide a seat retainer for automobiles of the type having a pair of side-by-side downwardly tiltable seat backs.

A further object is to provide such a seat retainer comprising an elongated brace member and a plurality of upstanding hooks respectively attached adjacent one of the ends thereof to the brace member whereby the hooks are adapted to be hung over the top of the tiltable seat backs with the brace member extending laterally across the seat backs to prevent separate movement thereof.

A further object is to provide such a seat retainer in which the brace member includes a first beam hollow from one end along a portion of the length thereof to define a longitudinally extending socket and a solid second beam telescopically received in said socket whereby said brace member is adapted to be extended for use and contracted for storage.

A further object is to provide such a seat retainer in which the brace member includes an intermediate bar and a pair of outer bars, one end of one of said outer bars being hingedly joined to one end of said intermediate bar and one end of the other of said outer bars being hingedly joined to the other end of said intermediate bar whereby said brace member may be folded for storage.

A further object is generally to improve the design and construction of seat retainers for automobiles.

The means by which the foregoing and other objects of the present invention are accomplished and the manner of their accomplishment will be readily understood from the following specification upon reference to the accompanying drawings, in which:

Fig. 1 is a perspective view of one embodiment of the present invention.

Fig. 2 is a rear elevational view of an automobile seat illustrating the seat retainer of the present invention in use therewith.

Fig. 3 is a front elevational view of the same.

Fig. 4 is a view similar to Fig. 3 illustrating an alternate form of the present invention.

Fig. 5 is a view similar to Fig. 2 illustrating another alternate form of the invention.

Fig. 6 is an elevational view showing the seat retainer of Fig. 5 in folded disposition.

Fig. 7 is an elevational view of still another form of the present invention.

Fig. 8 is a fragmentary sectional view taken as on the line VIII—VIII of Fig. 7.

Fig. 9 is a view similar to Fig. 2 illustrating another alternate form of the invention.

Fig. 10 is a sectional view taken as on the line X—X of Fig. 9 with parts removed for purposes of clarity.

Fig. 11 is a sectional view taken as on the line XI—XI of Fig. 9 with parts removed for purposes of clarity.

Fig. 12 is a sectional view taken as on the line XII—XII of Fig. 9 with parts removed for purposes of clarity.

Referring now to the drawings in which the various parts are indicated by numerals, the seat retainer 10 of the present invention comprises in general an elongated brace member 11 and a plurality of hooks 13 attached thereto. Brace member 11 and hooks 13 are preferably formed of a strong rigid material, as for example, iron, steel, aluminum or the like.

Each of hooks 13 is substantially of an inverted U-shape and is attached adjacent one end 15 thereof to brace member 11 as by welding or may be formed integral therewith. If attached by welding, the end 15 preferably overlaps the width of brace member 11 instead of being attached adjacent the top edge thereof whereby additional strength is provided.

Hooks 13 are laterally spaced along the length of brace member 11 and are disposed substantially perpendicular thereto. There are preferably three of hooks 13, an intermediate hook 17 disposed intermediate the ends of brace member 11 preferably closer to one end than the other and a pair of outer hooks 19, 20 disposed on either side of intermediate hook 17 adjacent the opposite ends of brace member 11, preferably spaced inwardly from the tips thereof. Additionally, hooks 13 are in lateral alignment and may be covered with a covering 21, as paint, plastic tubing or the like to protect the car seats.

Thus, from the foregoing it will be seen the basic concept of the present invention comprises a brace member 11 having laterally spaced hooks 13 projecting substantially perpendicular therefrom. The dimensions of hooks 13 are such that the hooks are adapted to embrace the tops 23, 25 of a pair of side-by-side downwardly tiltable seat backs 27, 29 of an automobile seat 31 with brace member 11 extending laterally across backs 27, 29 in close adjacency thereto. The brace member 11 preferably extends across the rearward sides 33, 35 of backs 27, 29 with hooks 13 extending forwardly over tops 23, 25, as best illustrated in Figs. 2 and 3, whereby the brace member is removably suspended in a horizontal position by the hooks. Brace member 11 is preferably of such a length that the opposite ends thereof extend slightly past the outside edges of seat backs 27, 29 so that the brace member will bear against the steel seat supports instead of the upholstered part of the seat backs. It will be understood that seat retainer 10 when employed with a car seat 31 as above described will lock the seat backs 27, 29 together and prevent relative movement thereof. Thus, the driver's back resting against seat back 27 will prevent the seat back from tilting forwardly and since seat retainer 10 prevents relative movement of seat backs 27, 29, the passenger's seat back 29 will be prevented from tilting. This retaining action of seat retainer 10 may be further explained as follows: Any force attempting to tilt seat back 29 forwardly will be resisted by the hooks 13 hung over top 25 since these hooks are held stationary by brace member 11 which is held stationary by seat back 27 which in turn is held stationary by the driver. Thus, it will be apparent a single "baby car seat" 37, as illustrated in Fig. 3, or a pair of "baby car seats" 37, as illustrated in Fig. 4, may be suspended over the passenger's seat back 29 and so be adapted to carry babies therein in perfect safety without the danger of injury to the babies which might occur if the seat backs were free to tilt forwardly. It will be understood that hooks 13 are thin, as best shown in Fig. 8 and Fig. 1, and lie flat against the forward side of seat backs 27, 29 so that the "baby car seats" 37 can be hung thereover as best shown in Fig. 4 and there will be no obstruction or interference by hooks 13 with persons riding in the automobile seat 31.

A number of alternate forms of the seat retainer 10 are contemplated without departing from the spirit and scope of the present invention. Thus, intermediate hook 17 may be disposed on brace member 11 closer to the outer hook 19, which is to the left as viewed in Fig. 1, than to the outer hook 20, which is to the right as viewed in Fig. 1. In such a disposition intermediate hook 17 and outer hook 19 are adapted to be hung from the passenger's seat back 29 and outer hook 20 from the driver's seat back 27, as best illustrated in Figs. 2 and 3. Another embodiment is illustrated in Fig. 4 in which intermediate hook 17 is disposed closer to outer hook 20 than to outer hook 19 whereby hooks 17 and 20 are adapted to be hung from driver's seat back 27 and outer hook 19 from passenger's seat back 29.

Brace member 11 may be constructed as illustrated in Figs. 1, 2, 3 and 4, wherein the brace member is in the form of a flat rigid piece of elongated material, as iron, steel aluminum or the like, and is rectangular in cross section. Another construction which provides more strength is illustrated in Figs. 7 and 8, wherein the brace member is T-shaped in cross section, to provide a horizontally extending strengthening rib 39 integrally formed intermediate the upper and lower edges of vertical piece 41.

Although either of the above mentioned embodiments may be carried in the trunk of the automobile, an alternate contractable construction is contemplated for ease in handling when not in use. Thus, one form of such a construction is illustrated in Figs. 5 and 6, wherein it will be seen brace member 11 comprises an elongated intermediate bar 43 and a pair of elongated outer bars 45, 47. One end of outer bar 45 is hingedly jointed to one end of intermediate bar 43 as by hinge 49 and the other end of intermediate bar 43 is hingedly joined to one end of outer bar 47 as by hinge 51 to form the brace member which is adapted to be folded as illustrated in Fig. 6. Hooks 13 are preferably positioned along bars 43, 45 and 47 so that when in the folded disposition hooks 17, 19 and 20 are disposed side-by-side as illustrated in Fig. 6.

Another form of a contractable construction is illustrated in Figs. 9, 10, 11, and 12, wherein it will be seen brace member 11 comprises a first beam 53 of T-shaped cross section, as best illustrated in Fig. 10, and a second beam 55 also of T-shaped cross section, as best illustrated in Fig. 12, but larger in overall cross sectional dimensions than beam 53. Second beam 55 is hollow from one end along a portion of the length thereof to define a longitudinally extending socket 57 having a T-shaped cross section slightly larger than the dimensions of beam 53 to provide a close but sliding fit. Second beam 53 is preferably solid in cross section and slidably received in socket 57, whereby the brace member may be extended for use, as best illustrated by the solid lines in Fig. 9, or contracted for handling or storage. In the contracted disposition of the brace member the position of the outer hook 20 is shown in dotted lines in Fig. 9. Additionally in Fig. 9 the end of the beam 53 when in the extended position is indicated as at 59 and when in the contracted position is indicated as at 61.

From the foregoing description it is apparent that a new and useful seat retainer 10 is provided which is an inexpensive, convenient means for locking the car seat backs together against relative movement and which is a valuable contribution towards safety.

I claim:

A seat retainer for an automobile seat having a pair of side-by-side downwardly tiltable backs, said retainer comprising an elongated brace member, a plurality of upstanding hooks each attached adjacent one of the ends thereof to said brace member at laterally spaced intervals whereby said hooks are adapted to be hung over the top of said seat backs with said brace member extending laterally across said seat backs to prevent separate movement thereof, said brace member including an intermediate bar and a pair of outer bars, one end of one of said outer bars being hingedly joined to one end of said intermediate bar and one end of the other of said outer bars being hingedly joined to the other end of said intermediate bar whereby said brace member may be folded for storage.

References Cited in the file of this patent
UNITED STATES PATENTS

| | | |
|---|---|---|
| 1,673,433 | Wheeler et al. | June 12, 1928 |
| 2,288,692 | Fearson | July 7, 1942 |
| 2,530,384 | Faggen | Nov. 21, 1950 |
| 2,602,488 | Conning | July 8, 1952 |
| 2,650,650 | Brown | Sept. 1, 1953 |
| 2,685,331 | Gauntlett et al. | Aug. 3, 1954 |
| 2,818,274 | Mands | Dec. 31, 1957 |